United States Patent

Focke et al.

[11] Patent Number: 5,417,543
[45] Date of Patent: May 23, 1995

[54] PROCESS AND APPARATUS FOR HANDLING BLANK STACKS

[75] Inventors: Heinz Focke, Verden; Pavel Livotov, Hanover, both of Germany

[73] Assignee: Focke & Co. (GmbH & Co.), Verden, Germany

[21] Appl. No.: 87,252

[22] Filed: Jul. 8, 1993

[30] Foreign Application Priority Data

Jul. 10, 1992 [DE] Germany .......... 42 22 609.0

[51] Int. Cl.⁶ .......................... B65G 59/02
[52] U.S. Cl. .................. 414/796.9; 414/907
[58] Field of Search ........... 414/786, 903, 907, 795.5, 414/796.6, 796.9, 795.7; 901/35, 31, 39

[56] References Cited

U.S. PATENT DOCUMENTS

| | | |
|---|---|---|
| 2,609,106 | 9/1952 | Tesch, Jr. |
| 4,671,723 | 6/1987 | Feldkämper .......... 414/796 |
| 4,732,522 | 3/1988 | Pencé .......... 414/796.7 |
| 4,911,608 | 3/1990 | Krappitz et al. .......... 414/796.9 X |
| 5,040,942 | 8/1991 | Brinker et al. .......... 414/796 |
| 5,096,370 | 3/1992 | Mohr .......... 414/795.5 X |

FOREIGN PATENT DOCUMENTS

| | | |
|---|---|---|
| 270943 | 6/1988 | European Pat. Off. . |
| 363722 | 4/1990 | European Pat. Off. .......... 414/796.4 |
| 422562 | 4/1991 | European Pat. Off. . |
| 1065430 | 3/1960 | Germany . |
| 3221351 | 12/1983 | Germany . |
| 3811993 | 11/1988 | Germany . |
| 3910817 | 1/1990 | Germany . |
| 4024451 | 2/1991 | Germany . |
| 4028150 | 3/1991 | Germany . |
| 4001051 | 7/1991 | Germany . |
| 3718601 | 8/1991 | Germany . |

Primary Examiner—Andres Kashnikow
Assistant Examiner—Kevin P. Weldon
Attorney, Agent, or Firm—Sughrue, Mion, Zinn, Macpeak & Seas

[57] ABSTRACT

Disclosed are a process and an apparatus for handling stacks of blanks (blank stacks 13). Blanks for the production of cigarette packs, especially of the hinge-lid type, are provided in the form of blank stacks (13). The blank stacks (13) are located on a base, especially on a pallet. A lifting head (18) serves for picking up and transferring the blank stacks (13) to the packaging machine. The lifting head comprises a stack lifter (28) for lifting the blank stacks (13) and a stack holder (20) for grasping and discharging the blank stacks. The stack lifter (28) is equipped with air nozzles (55) which direct an air jet downwardly onto the base (separator sheet 16) when the blank stack (13) is grasped and thus ensure that lower blanks (10) of the blank stack (13) which have not been grasped originally are lifted up as well. The lifting head (18) is also provided with (suction 59) for grasping an upper separator sheet (16) unilaterally at an edge thereof.

12 Claims, 5 Drawing Sheets

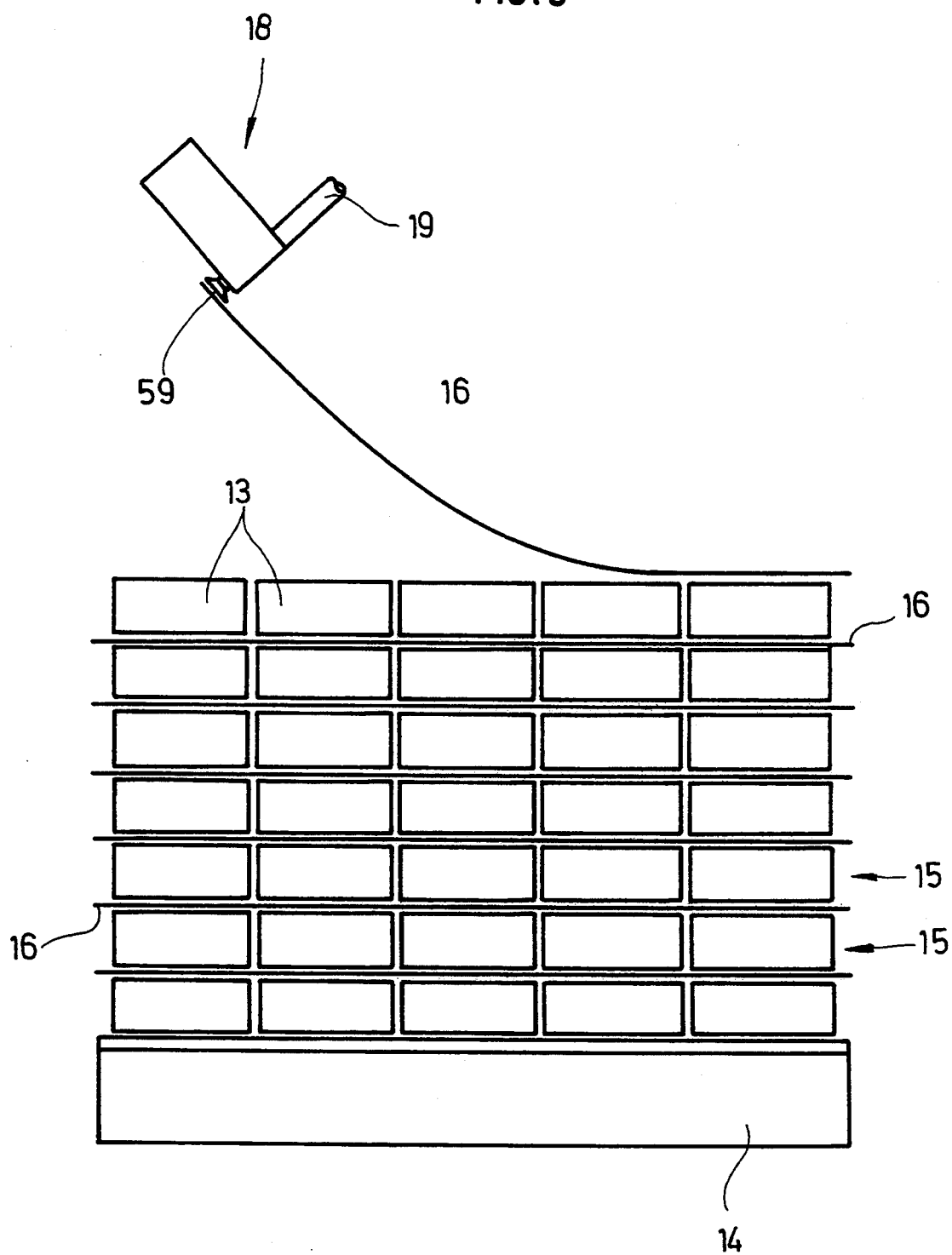

PROCESS AND APPARATUS FOR HANDLING BLANK STACKS

BACKGROUND OF THE INVENTION

The invention relates to a process for handling stacks of blanks (blank stacks), especially in conjunction with a packaging machine, in which the blank stacks rest on a base and are removed from this base in order to be processed in the pack aging machine. Additionally, the invention relates to an apparatus for carrying out this process.

In high capacity packaging machines, for example cigarette packaging machines, the handling of the packaging material is a specific problem, even more so when the packaging material is provided in the form of prefabricated stacked blanks. Cigarette packs of the hinge-lid type are formed from blanks of thin cardboard. These blanks are delivered by the manufacturer in the form of blank stacks, for example on a pallet.

The invention is directed to the problem of automatically and mechanically handling the blank stacks without any involvement of manual work. The blank stacks must be removed from the base (pallet) and introduced into the packaging process.

Known in the art are apparatus which have one or more stack holders for grasping and holding one blank stack each. The stack holders are formed from a clamping tongue resting on the underside of the blank stack, and a counter pressure means acting upon tile top side (DE-A-37 18 601). The problem with such apparatus is to move the clamping tongue underneath the blank stack which rests on a base. In the above mentioned prior art apparatus, the blank stack is deformed by a pressure piece acting upon the top side, such that a gap is formed underneath the stack on the side assigned to the clamping tongue, and the clamping tongue is introduced into this gap.

SUMMARY OF THE INVENTION

It is the object of the invention to further improve and develop the above mentioned apparatus such that the blank stacks can be grasped and discharged reliably at high performance rates without the risk of being damaged.

To attain this object, the process according to the invention is characterized in that the blank stack is lifted off the base, and in that the few lowermost blanks of the blank stack which are not grasped are lifted up as well by an air jet which is directed from above onto the base next to the stack.

The invention is based on the finding that, especially when a blank stack is lifted by means which act upon side faces of the blank stack, lowermost blanks are not grasped. In order to grasp the entire blank stack, an air jet is directed according to the invention from above onto the base next to the blank stack. Surprisingly, this air jet lifts the lowermost blanks off the base and moves them up to the blank stack.

The apparatus according to the invention comprises at least one stack lifter for lifting the stack off the base, and at least one air nozzle by means of which a downwardly directed air jet is directed against the base.

Expediently, the complete apparatus is designed such that the blank stack which is fully lifted by the stack lifter and an air blast is grasped and discharged by a stack holder which grasps the stack at the top side and underside by appropriate holding means.

According to the invention, the apparatus is formed from several side-by-side units, each for grasping one blank stack, so that, for example, four blank stacks can be lifted and discharged simultaneously. A lifting head designed in this manner may, for example, be disposed on a robot, in particular on the articulated arm of the robot.

According to a further proposal of the invention, the lifting head can also be used for removing separator sheets which separate layers of the blank stack which are arranged on top of one another. According to the invention, these separator sheets, which may for example be formed from paper, are grasped at an edge by the lifting head and are removed without any friction by way of rolling off or being pulled off the blank stacks located thereunder.

Further details of the invention will be described, hereinafter, in greater detail with respect to an exemplary embodiment and the accompanying drawings, in which:

BRIEF DESCRIPTION OF THE DRAWINGS

FIG. 8 shows a pallet with blank stacks during the removal of a separator sheet.

DESCRIPTION OF PREFERRED EMBODIMENTS

Figure 1:
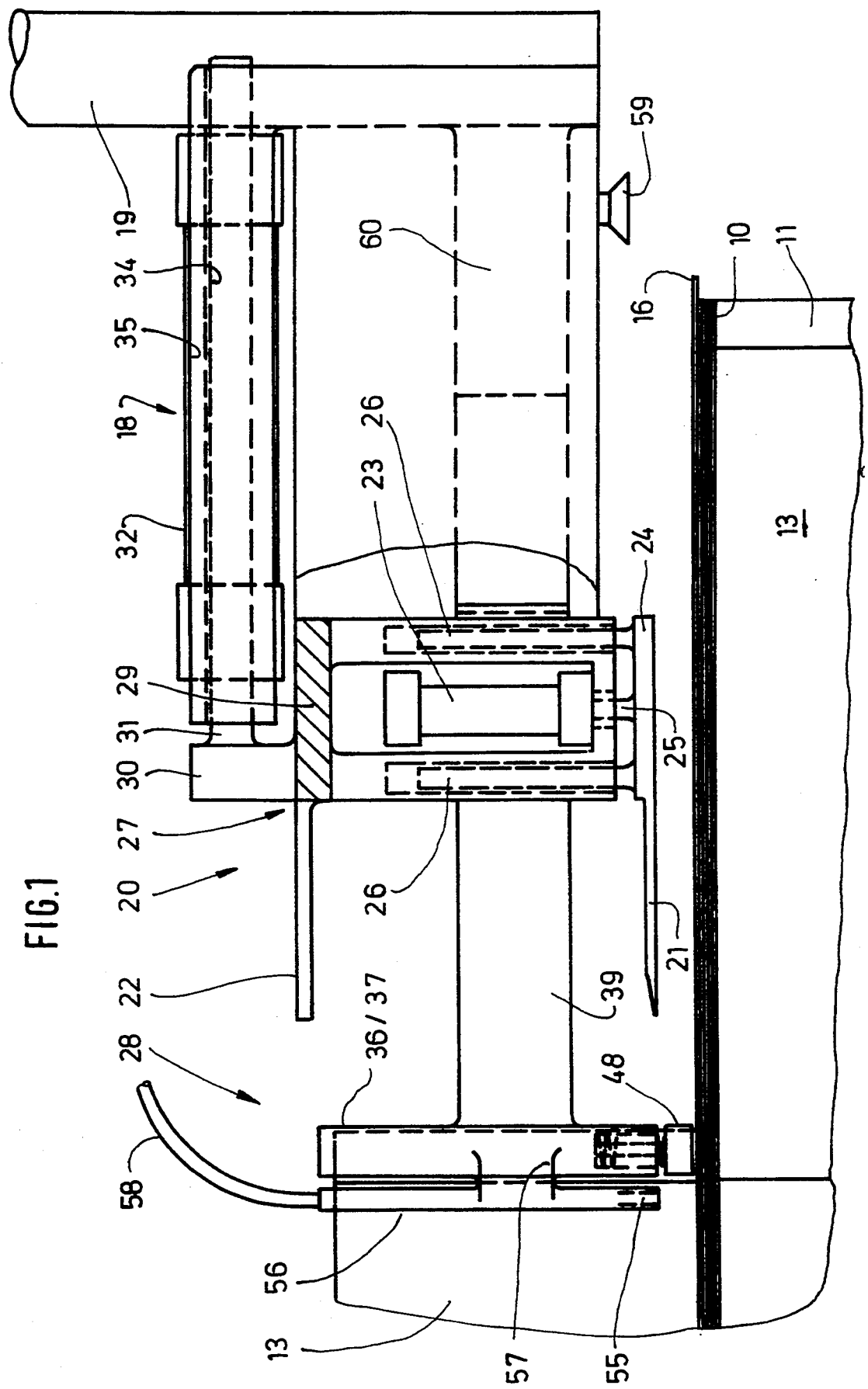
FIG. 1 is a side view, partly shown in vertical section, of a portion of a lifting head.

The exemplary embodiment illustrated in the drawings is directed to the handling of blanks 10 of thin cardboard. In particular, these are blanks for cigarette packs of the hinge-lid type. The blanks 10 and the packs formed therefrom have an almost identical shape all over the world. A characteristic feature of these blanks is a central projection 11 which is located in the region of a head end and serves for forming a lid of the pack. This projection has a significantly smaller width than the rest of the blank 10. In the pack, the projection 11 serves for forming an inner lid tab which rests on the inner side of a front wall of the lid after being folded.

The projection 11 is adjoined by an inclined edge 12 on both sides of the blank. This inclined edge 12 also corresponds to the conventional design of a blank 10 for this pack type. The edge 12 forms the lower delimitation of an outer side wall of the lid.

The blanks 10 are delivered in the form of stacks, in particular blank stacks 13, in order to be processed, especially in packaging machine (not shown). The blank stack is formed from approximately 500 blanks 10.

Several blank stacks 13 are provided on one base. In the present exemplary embodiment, the blank stacks 13 rest on a pallet 14. Several layers of such blank stacks 13 are arranged on top of one another in the form of stack layers 15. The individual stack layers 15 are separated from one another by separator sheets 16 formed from a thin flexible blank, especially from a blank made of paper. Within a stack layer 15, the blank stacks 13 are disposed in rows of side-by-side blank stacks 13. The configuration is such that the longitudinal axes of the elongated blanks extend parallel to one another. Each projection 11 is located on a free side of the stack layer 15.

The blank stacks 13 are removed from the pallet 14 in layers and are introduced into the packaging process of the packaging machine. For this purpose, a handling device is used, especially a customary robot with a cantilever arm and a lifting head 18 attached thereto. In the present exemplary embodiment, the lifting head 18 is connected to the cantilever arm of the robot or another device by a central supporting rod 19.

The lifting head 18 is designed for a simultaneous lifting of several blank stacks 13. In the present case, four side-by-side blank stacks 13 are picked up and discharged. The blank stacks 13 may be deposited by the lifting head 18 on a transporting means, for example a conveyor belt.

When the (four) blank stacks 13 are picked up by the lifting head 18, the blank stacks 13 are, first of all, lifted completely and then taken up by stack holders assigned to each blank stack 13. Each stack holder 20 is provided with means for grasping a blank stack 13 at opposite sides, in particular at the underside and the top side. A clamping tongue 21 contacts the blank stack 13 at the underside. At the top side, a pressure plate 22 acts as a counter pressure means. Clamping tongue 21 and pressure plate 22 can be moved relative to one another. In the present case, the lower clamping tongue 21 is movable up and down by a pressure medium cylinder 23. The clamping tongue 21 is disposed on a carrier piece 24 and projects therefrom unilaterally. The carrier piece is connected with a piston rod 25 of the upright pressure medium cylinder 23. Guide pins 26 are attached to the carrier piece 24 and slide up and down in bores of a supporting frame 27 when the clamping tongue 21 moves.

Figure 2:
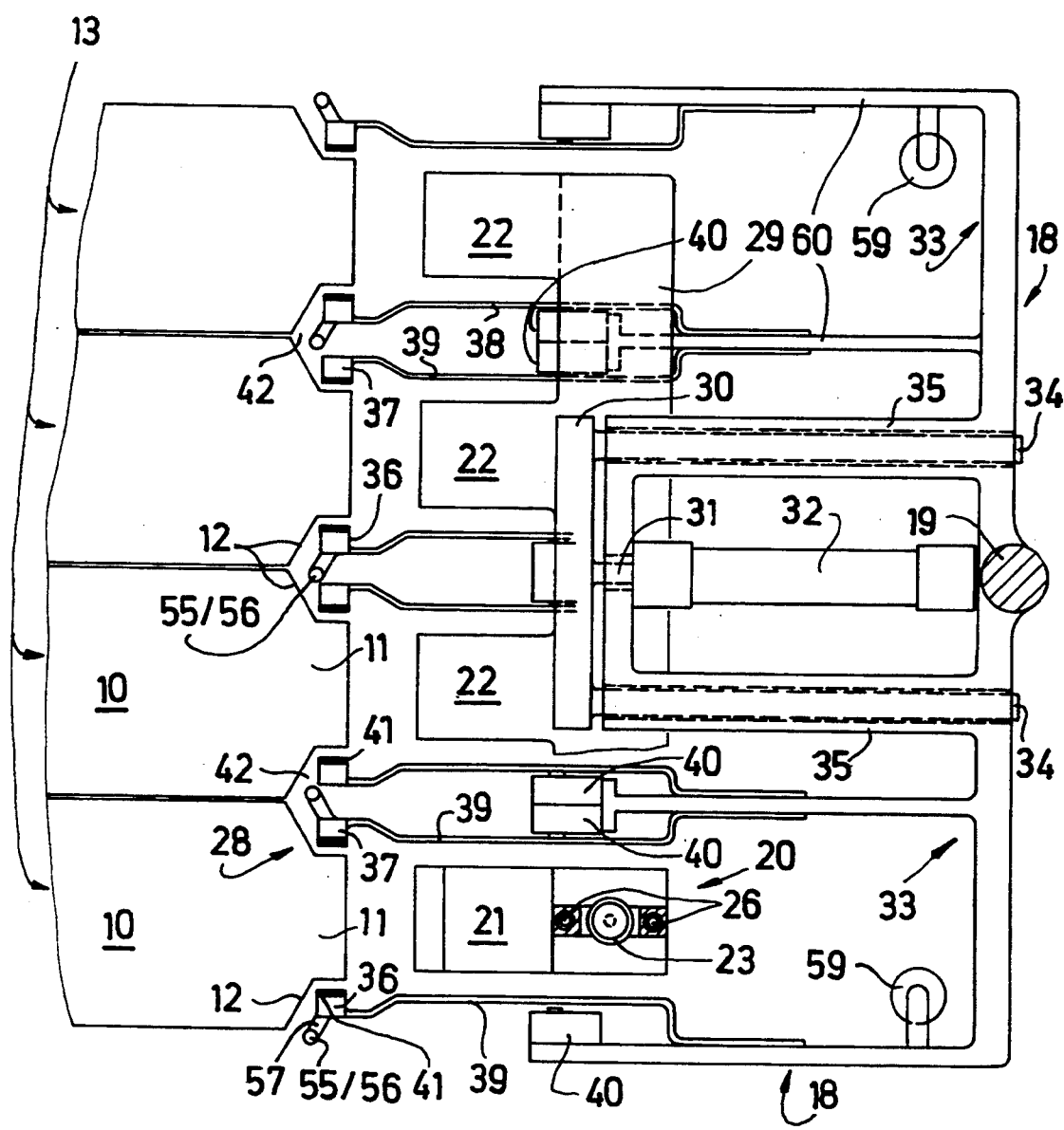
FIG. 2 is a plan view of a lifting head.

The lifting head 18 is provided with separate means for lifting the blank stack 13, such that the stack holder 20 can move into the receiving position for grasping the blank stack 13, i.e. with the clamping tongue 21 underneath the blank stack 13. Each stack holder 20 is associated with a stack lifter 28. This stack lifter is used before a blank stack 13 is grasped by the stack holder 20. For this purpose, the stack lifter 28 projects beyond the stack holder 20 in the initial position (FIGS. 1 and 2). When the lifting head 18 is moved toward the blank stacks 13 which are to be grasped, the stack lifters 28 reach the working position first. They grasp and then lift the associated blank stack 13. Thereafter, the stack holders 20 are moved relative to the stack lifters 28 in the direction of the blank stacks 13 until the clamping tongue 21 and the pressure plate 22 are located in position above and below the blank stack 13.

For this purpose, the stack holders 20 are movable as a whole relative to the stack lifters 28. All stack holders 20 of the lifting head 18 are attached to a horizontal crosspiece 29 in the form of a flat section, in particular underneath this crosspiece. The supporting frames 27 for the clamping tongues 21 are located on the underside of the crosspiece 29. The pressure plates 22 take the form of comb-like projections of the crosspiece 29.

At the top side, the crosspiece 29 is connected to an intermediate piece 30 formed from a rectangular section. This intermediate piece is located centrally on the crosspiece 29 and is connected to a piston rod 31 of a horizontal pressure medium cylinder 32 which acts as an actuating means for the stack holders 20.

The pressure medium cylinder is located on a frame-like supporting device 33 of the lifting head 18. Additionally, the crosspiece 29 is guided accurately with guide rods 34 in bores of a guide 35 of the supporting device 33. When the piston rod 31 is extended and retracted, the stack holders 20 are shifted in the direction toward the blank stacks 13 which are to be taken up or back into the initial position of FIGS. 1 and 2.

The stack lifters 28 are designed in a special way. They take the form of clamping tools which laterally grasp and lift each blank stack 13. In the present exemplary embodiment, the specific shape of the blanks 10 is utilized for grasping the stacks.

Each stack lifter 28 is equipped with two upright clamping jaws 36, 37. The clamping jaws are disposed on the ends of horizontal actuating arms 38, 39. In this embodiment, these arms consist of a flat section, especially a flat section made of spring steel. As a result, the actuating arms 38, 39 are elastic ally deformable like leaf springs, i.e. they are pivotable horizontally. For this purpose, each actuating arm 38, 39 is associated with an actuating means, especially a pressure medium cylinder 40 with an extendable piston rod which takes the form of a short-stroke cylinder. The piston rod of this cylinder directly contacts the actuating arm 38, 39.

The pressure medium cylinders 40 are disposed on the free ends of horizontally directed supporting struts 60 of the lifting head 18. These supporting struts 60 take the form of flat sections and a 1 so serve for fixing the actuating arms 38, 39 with a bent free end.

The upright clamping jaws 36, 37 are disposed at the ends of the actuating arms 38, 39 and contact the blank stacks 13 in the region of the projection 11 of the blanks 10, that is to say of the blank stacks 13. The narrow clamping jaws 36, 37 have an elastic contact surface 41 which contacts the blank stack 13.

As a result of the equal and side-by-side orientation of the blank stacks 13 within the rows 17, recesses 42 are formed in the region of head ends of the blank stacks 13, which recesses are defined by the projections 11 and the edges 12. The clamping jaws 36, 37 of the adjacent stack lifters 28 enter these recesses 42 by means of an appropriate advance of the lifting head 18. In the position of FIG. 2, the clamping jaws 36, 37 can be subjected to clamping force, such that they contact and clamp the projections 11 of the blank stack 13.

Figure 3:
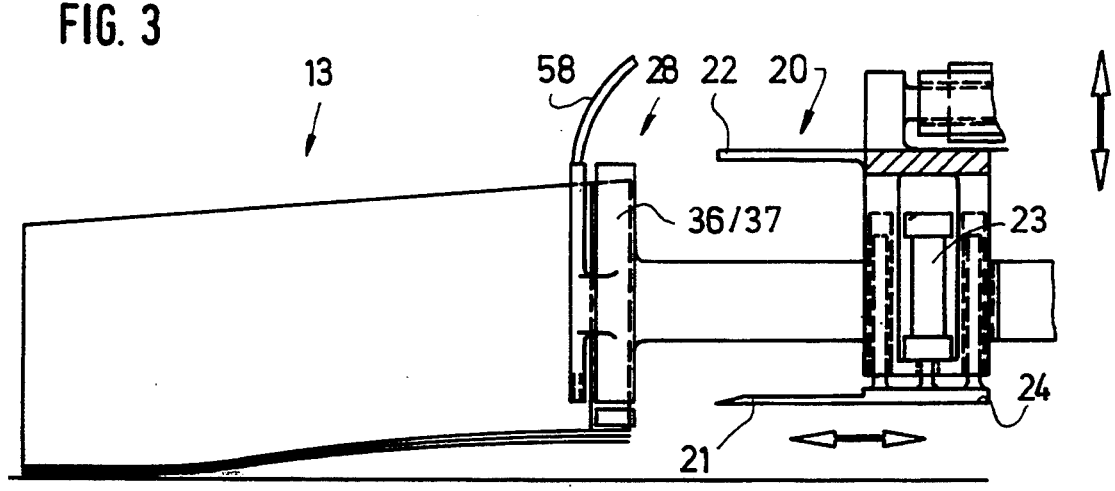
FIG. 3 to FIG. 5 show side views of a portion of a lifting head during the process of grasping a blank stack.
Figure 4:
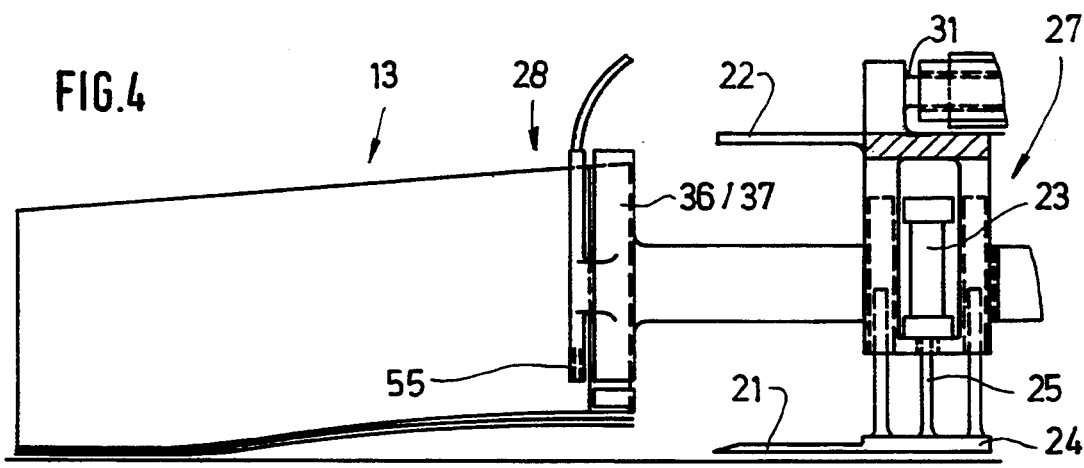
Figure 5:
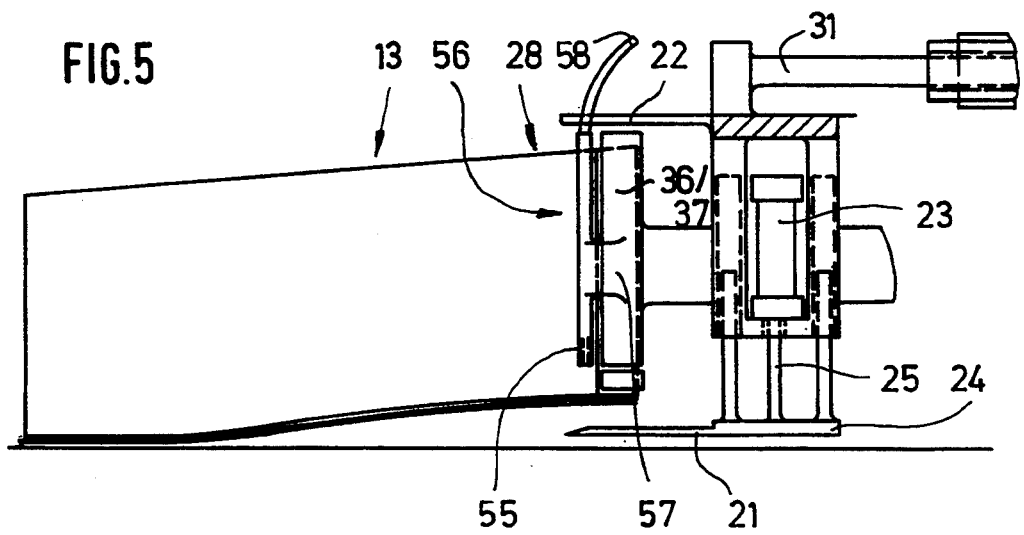
Figure 6:
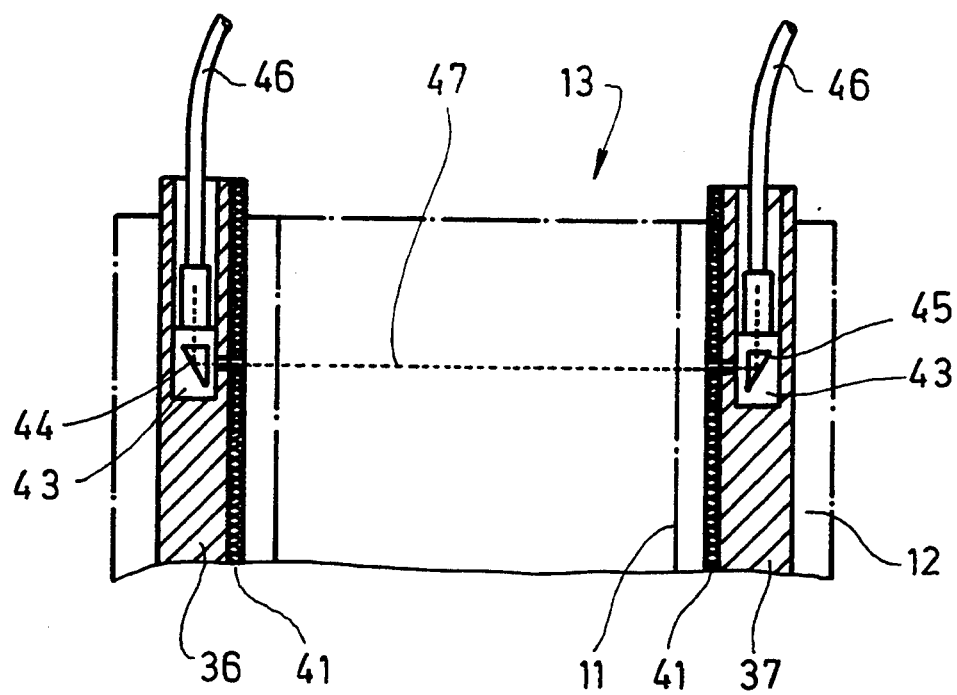
FIG. 6 shows a detail of a lifting head, in particular a vertical section of clamping jaws.
Figure 7:
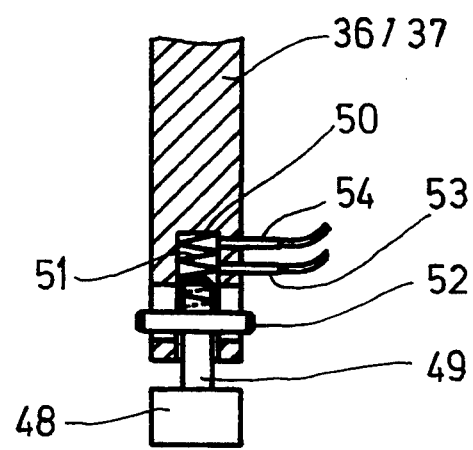
FIG. 7 shows a further detail, in particular another vertical section of a clamping jaw in the lower region of the jaw.

After the blank stacks 13 have been grasped by the stack lifters 28, they are lifted to a position shown in FIGS. 3 to 5. This lifting movement can be conducted by way of lifting the entire lifting head 18. Because the blanks 10 or blank stacks 13 are grasped only at a head end (projections 11), a portion of the blank stacks 13 is lifted which faces the stack lifters 28. However, the partially lifted position of the blank stacks 13 is sufficient to move the stack holders 20 into position. The sequence of movements is illustrated in FIGS. 3 to 5. Once the blank stacks 13 are in the lifted position (FIG. 3), the clamping tongue 21 is downwardly extended (FIG. 4). As a result, the clamping tongue is located in a plane below the (lifted) blank stack 13. Then, all stack holders 20 are moved together in the direction toward the blank stacks 13 until the clamping tongue 21 and the pressure plate 22 reach the receiving position below and above the blank stack 13. Subsequently, the clamping tongue 21 is moved upwards, so that the blank stack 13 is grasped in a clamping fashion in the region of the head end. Now, the lifting head 18 can be lifted as a whole together with the blank stacks 13 and can be moved to the position in which the blank stacks 13 are deposited.

The specific contour of the blanks 10 in the head region, i.e. the narrow projection 11 and the adjoining inclined edges 12 facilitate the positioning of the clamping jaws 36, 37 of the stack lifter 28. The (open) clamping jaws 36, 37 are moved up to the blank stacks 13 in the region of the inclined surfaces formed from the edges 12 and then slide along these surfaces when the clamping jaws 36, 37 are closed. The inclined surfaces thus effect a guidance of the clamping jaws 36, 37 during the closing process.

The stack lifters 28 and their clamping jaws 36, 37 are designed in a special way. Optoelectric sensors 44, 45 are disposed in a cavity 43 of the clamping jaws 36, 37—in the present case a bore which passes into the clamping jaws from the top side. These sensors are connected to an electronic interpreting means via lines 46. The sensors 44, 45 create a light barrier 47. This monitoring device determines for each stack lifter 28 whether a blank stack 13 is present in the region of the respective stack lifter 28 and is located in a proper position.

At least the two outer clamping jaws 36, 37 of the lifting head 18 are provided with a further sensing means. This sensing means is a sensing slide 48 which is disposed on the underside of the clamping jaws 36, 37. The sensing slide forms the lower portion of the clamping jaw 36, 37 which means it is part of the clamping jaw. The sensing slide 48 is mounted displaceably with a pin 49 in an upright bore 50 of the clamping jaw 36, 37, in particular against the pressure of asp ring 51 located in the bore 50. A transversely directed locking pin 52 inhibits rotational movements of the sensing slide 48 and prevents it from falling out of the bore 50.

The sensing slide 48 is provided to ensure that the clamping jaws 36, 37 correctly rest on the base, especially on the separator sheet 16, in the position for lifting a blank stack 13. The stack lifters 28 are moved toward the blank stacks 13 and are, first of all, lowered when they are in the clamping position until the sensing slide 48 contacts the lower end of the remaining portion of the clamping jaw 36, 37, thereby pressing together the spring 51. Now, a signal is generated which initiates the clamping process. In this case, so-called proximity switches 53, 54 are used as signal transmitters. As a safety precaution, two of these proximity switches are arranged on top of one another in this case. The proximity switches 53, 54 are triggered by the pin 49 of the sensing slide 48 during its upward movement.

The actual outstanding feature of the apparatus is the measure provided for accurately receiving and accurately lifting up the blank stack 13 with all blanks 10. As a result of the clamping position, the clamping jaws 36, 37 are not suitable for reliably taking up the entire blank stack 13. Experience shows that lower blanks 10, for example the two, three or four lowermost blanks 10 are not grasped. However, these lowermost blanks must also be picked up by the stack holder 20.

For this purpose, the stack lifters 28 are associated with separate lifting means which ensure an upward movement, that is to say a lifting of the lower blanks 10 which are not grasped by the clamping jaws 36, 37. For this purpose, an air jet is directed onto the base from above, in particular onto the respective uppermost separator sheet 16. The air jet hits the separator sheet 16 next to the blank stacks 13, in particular in a region immediately adjacent to the clamping jaws 36, 37. The vertically or nearly vertically directed compressed air jet lifts the lower free blanks 10 from the base (separator sheet 16), such that these blanks are up to the underside of the lifted blank stack 13 at least in the region of the projection 18. As a result, the means of the stack holder 20 can grasp the entire blank stack 13 at the underside.

The compressed air jet is generated by upright air nozzles 55. These are upright pipe pieces 56 which are connected to the adjacent clamping jaw 36, 37 by a connecting piece 57. The pipe piece 56 or air nozzle 55 is connected to a (central) compressed air source via a tube line 58.

The air nozzles 55 are disposed in the region of the recesses 42, i.e. laterally next to the blanks 10. It is important for an effective operation of the air nozzles 55 and the air jet that such an air jet takes effect on both sides of each blank stack 13. In the present example, only one air nozzle 55 is located in the recesses 42 between adjacent blank stacks 13, and thus acts upon both adjacent blank stacks 13.

The compressed be air can directed onto the base through the air nozzles 55 with a pressure of 5 to 7 bar. In the lower position of the stack lifter 28, the distance between the air nozzles 55 and the base (separator sheet 16) is approximately 5 to 10 mm in the illustrated exemplary embodiment. The inner diameter of the air nozzle 55 and the pipe piece 56 is approximately 4 mm.

The mode of operation of the stack lifter 28 which is constructed in this manner is of prime importance for the operativeness of the apparatus. When several side-by-side blank stacks 13 are to be grasped simultaneously, it is important that the blanks 10 are designed with a portion having a reduced width, so that the clamping means of the stack lifter 28 can clamp the blanks from the sides. The effect of the air nozzles 55, that is to say of the (nearly) vertical air jet permits a complete take-up of the blank stacks 13 without any risk of damaging the lower blanks by mechanical means.

The apparatus is provided with another outstanding feature. When a stack layer 15 formed from blank stacks 13 has been removed, a separator sheet 16 rests freely on the following stack layer 15. The separator sheet 16 has to be removed without shifting the blanks of the stack layer 15 located thereunder.

In the illustrated apparatus, the lifting head 18 is provided with means for grasping the upper free separator sheet 16. These are suction means 59 which grasp the separator sheet 16 at the top side by means of negative pressure. The suction means—in the present exemplary embodiment two suction means—are disposed on the lifting head 18, in particular on the supporting device 33 thereof. The suction means 59 are located in a region which is situated away from the stack holder 20 and the stack lifter 28 and faces the rearward part of the lifting head 18, in particular on the sides, i.e. spaced apart at a great distance. After a stack layer 15 has been removed, the lifting head 18 moves across the pallet 14 until the suction means 59 grasp the separator sheet 16 in a marginal region. The lifting head 18 is now lifted and tilted simultaneously and, as a result, the separator sheet 16 is lifted on one side and is gradually lifted off the following stack layer 16 in a rolling movement, as it is evident from FIG. 8. Accordingly, no transversely directed (frictional) forces are exerted on the blanks 10 of the following stack layer 16. Naturally, this method of removing a separator sheet 16 may also be used independent of the specific design of the means for transporting the blank stacks 13.

We claim:

1. A process for handling vertical stacks of blanks, in conjunction with a packaging machine, in which the stacks (13) rest on a base and are removed from the base in order to be processed in the packaging machine, said method comprising the steps of: mechanically grasping and lifting up all but a lowermost few of blanks in each stack (13) from the base; and lifting up the lowermost few blanks (10) of the stack (13), which are not mechanically grasped, by directing an air jet from above onto the base next to the blank stack.

2. The process as claimed in claim 1, wherein the stack (13) is mechanically grasped and lifted up by mechanical clamping jaws (36, 37) of a stack lifter (28), and wherein, simultaneously, the air jet is directed onto the base next to blank stack (13).

3. The process as claimed in claim 2, wherein at least one air jet is directed onto the base at both sides of the stack (13) adjacent to the clamping jaws (36, 37).

4. The process as claimed in claim 1 or 2, wherein the stack (13) is, first of all, grasped at oppositely situated side faces of the stack and lifted up, and wherein, simultaneously, at least one air jet is directed against the base next to the stack (13), and wherein, after an entire stack (13) has been lifted up, said method further comprises the steps of grasping the stack at a top side and an underside, and lifting off the entire stack from the base.

5. An apparatus for handling vertically upright stacks of blanks resting on a base, in conjunction with a packaging machine, in which the stacks (13) are graspable, on a top side and an underside, and dischargeable by a lifting head (18) with stack holders (20), which head is disposed on a conveying means, said apparatus comprising: a separate stack lifter (28) for lifting up all but a lowermost few of the blanks in each stack; means for simultaneously directing an air jet from above against the base and adjacent to the stack (13); and clamping means, forming a part of the stack holders (20), for grasping the stack and lifting it off from the base.

6. The apparatus as claimed in claim 5, wherein the stack lifters (28) have upright clamping jaws (36, 37) which act upon upright side faces of the stack in a region of a projection (11) that is narrower than a remainder of the stack, and further comprising an air nozzle (55) for generating the air jet that is directed against the base, said nozzle being disposed laterally next to the stack (13) on the stack lifter (28).

7. The apparatus as claimed in claim 6, wherein there are a plurality of blank stacks on the base, said apparatus comprising a plurality of air nozzles (55), disposed in recesses (42) formed between adjacent blank stacks (13), and connected to the clamping jaws (36, 37).

8. The apparatus as claimed in claim 6, wherein the clamping jaws (36, 37) of the stack lifters (28) have on an underside a sensing slide (48) which is movable against elastic pressure into the clamping jaws (36, 37) when the stack lifters (28) contact the base (16), thereby triggering a signal.

9. The apparatus as claimed in claim 5, wherein each of the stack holders (20) has a lower clamping tongue (21) and an upper pressure plate (22) and has a retracted position relative to the stack lifter (28) in an initial position, and further comprising means for moving the stack holder in a direction toward the stack (13) after the stack has been lifted up, such that the clamping tongue (21) moves underneath the lifted stack (13) in order to act as a lower clamping means.

10. The apparatus as claimed in claim 9, wherein a plurality of stack holders (20), each for one blank stack (13), are disposed on a common crosspiece (29), and further comprising a central common pressure medium cylinder (32) for moving the crosspiece forward and backward.

11. The apparatus as claimed in claim 6, wherein the upright clamping jaws (36, 37) are disposed on actuating arms (38, 39) which are made of an elastic material, and further comprising pressure medium cylinders (40), assigned to each actuating arm (38, 39), for pivoting the actuating arm.

12. The apparatus as claimed in claim 7, wherein, in each recess (42) between two adjacent stacks (13), there is disposed a common air nozzle (55) for both adjacent stacks (13).

* * * * *